(12) United States Patent
Pesochinsky (10) Patent No.: US 10,878,453 B2
(45) Date of Patent: Dec. 29, 2020

(54) APPARATUS, SYSTEM AND METHOD FOR A COMMERCIAL CONTENT PROVIDER CONTROLLER FOR CONTROLLING AD CONTENT PROVIDED WITH WEB PAGE AND SEARCH RESULTS

(71) Applicant: Michael Pesochinsky, Wayne, NJ (US)

(72) Inventor: Michael Pesochinsky, Wayne, NJ (US)

( * ) Notice: Subject to any disclaimer, the term of this patent is extended or adjusted under 35 U.S.C. 154(b) by 505 days.

(21) Appl. No.: 14/472,464

(22) Filed: Aug. 29, 2014

(65) Prior Publication Data

US 2016/0063553 A1 Mar. 3, 2016

(51) Int. Cl.
*G06Q 30/02* (2012.01)
*H04L 29/08* (2006.01)
*G06F 16/951* (2019.01)

(52) U.S. Cl.
CPC ....... *G06Q 30/0257* (2013.01); *G06F 16/951* (2019.01); *H04L 67/02* (2013.01); *H04L 67/306* (2013.01)

(58) Field of Classification Search
CPC .................................................. G06Q 30/0257
See application file for complete search history.

(56) References Cited

U.S. PATENT DOCUMENTS

| | | | | |
|---|---|---|---|---|
| 6,912,571 B1* | 6/2005 | Serena | .................... | G06Q 30/02 705/14.4 |
| 2005/0096980 A1* | 5/2005 | Koningstein | .......... | G06Q 30/00 705/14.41 |
| 2008/0040175 A1* | 2/2008 | Dellovo | ............. | G06Q 10/0637 705/7.36 |
| 2008/0168371 A1* | 7/2008 | Coutts | .................... | G06Q 30/02 715/764 |
| 2008/0244046 A1* | 10/2008 | Campbell | ............... | H04W 4/02 709/222 |
| 2009/0281893 A1* | 11/2009 | Muhonen | ............... | G06Q 30/02 705/14.42 |
| 2010/0318426 A1* | 12/2010 | Grant | .................... | G06Q 20/10 705/14.66 |
| 2012/0084349 A1* | 4/2012 | Lee | ........................ | G06Q 30/02 709/203 |
| 2012/0116882 A1* | 5/2012 | Sanghavi | ........... | G06Q 30/0257 705/14.55 |
| 2013/0246414 A1* | 9/2013 | Nair | .................. | G06F 17/30867 707/732 |

* cited by examiner

*Primary Examiner* — Dawaune A Conyers
(74) *Attorney, Agent, or Firm* — Daniel Basov; Michael Pesochinsky (57) ABSTRACT

An Internet-based Commercial Content Provider Controller (CCPC) system and method that allows individual users to select and modify the commercial content provider, control the commercial content (ads) layout and choice of the commercial content provided with the Web page or as part of the search engine results delivered to such users by various Websites and search engines. The CCPC establishes and provide user with selection options and control over the CCPs and ad formats as part of the registration process or as a plugin for the browser, and further allows to replace ads appearing in the Web page results and search engine results by reference to the ad pattern database of commonly used ad pattern for Web sites that include commercial content, ad content providers and search engines in different regions and replacing the ads with those that correspond to user's preferences and CCP choices concerning ad content.

20 Claims, 7 Drawing Sheets

APPARATUS, SYSTEM AND METHOD FOR A COMMERCIAL CONTENT PROVIDER CONTROLLER FOR CONTROLLING AD CONTENT PROVIDED WITH WEB PAGE AND SEARCH RESULTS

FIELD OF THE INVENTION

The present invention pertains generally to an apparatuses, methods, and systems for automated Internet-based systems for controlling and management and control of the commercial advertisements and content delivered by search engine and browser results. In particular, it relates to systems and methods that allow users to control the delivery and the source of the commercial content ads that are supplied by the search engines and browsers through the custom settings and browser plug-in settings.

BACKGROUND OF THE INVENTION

The Web advertisement systems in common use today are deeply rooted in the TV-based and print media advertisements, where the user has little or no control over the choice of advertisers and advertisement providers that he or she prefers or selects to accompany the provided content. While the Web-based systems, search engines and Web sites are starting to utilize new possibilities offered by Web, that process is far from being very versatile or fully user-oriented. For example, Web advertisements presently allow user ads that are related to users' searches on the Internet or related to their past searches, often-visited Web sites, geographic location, language preferences and other preferences. However, one of the principles taken from the past advertisement methods on TV and in the print media (newspapers and magazines) is the choice of ad selections. In some cases, the ads provided to each Web site visitor are pre-selected by the site owner, where the site owner has either some proprietary interest or agreement with the advertisers for the delivered and displayed ads. Similarly, when search engine displays search results for the user and displays ads on the Web page for that use, those ads are chosen and selected by the search engine company/owner and served by that search engine's computers/servers.

In other cases, the Web site owners have no vested or proprietary interest in the choice of the displayed ads on their Web site. In such cases, the Web pages delivered to the user (Web site visitor) are dynamically created on the fly based on the search conducted, and possibly other factors. The content for some such ads may be delivered dynamically by the ad provider servers and then inserted into the Web page (HTML for example) that includes the search results and content from the search engine servers. However, the choice and selection of the ads and associated formatting are not left to the user, and the ad content is typically selected by a third party ad agency with whom the Web site owner may have an agreement or by the search engine provider.

While there are different services and computer programs which allow users to manipulate ads on the search engine pages, the choices available to the user are typically as follows: (1) completely block ads; (2) limit the number of ads; (3) define and limit ad locations on the Web page, ad appearance, or even change or modify the ads appearing on the page. These services and programs allow manipulation of the ads delivered by search engines in many ways. However, the current systems miss a number of very important and valuable aspects and choices concerning the ads served to the user. Among other missing aspects and choices that are discussed later, none of the current systems allow user to make selection of his or her preferred choice of the commercial content provider (CCP). Also, there is a lack of a comprehensive system that allows quick and efficient integration and operation with the existing search engines and different browsers, and also quickly adjusts to any changes in the ad formats utilized by the search engines for the delivery of search result content.

There are different and important reasons why some users might want to select and control the choice of which company or person provides them with the commercial content. It could be an objective preference for one provider over another, because ads from one provider are more interesting than from another one. It can be a subjective preference of the user toward the ads from a certain provider, including political, philosophical or some other preferences for a particular provider or opposition to others. It could be related to a stricter privacy protection offered by some CCPs. It could also be based on a contractual agreement between the user and a third party, which requires the user to choose certain CCP over others as a consideration under such contract. Finally, it could also be based on a direct compensation arrangement, where the user is paid by the CCP or shares with CCP the user-generated revenues.

Thus, there is a need for a system that allows greater choices over the ad content and the choice over CCP for the Web page results in general and for search engine users. There is a need for a system to allow users to decide which CCP(s) should provide their ads that appear with the Web page results in general and with search engine results in particular. There is also a need for a comprehensive CCP control management system that allows Web users and search engine users to have multiple options such as selecting no ads, select which CCP(s) should provide ads that appear with the Web and search engine results, control the appearance of the ads presented by various Web pages, search engines and browsers, and optionally allow users to receive certain consideration, virtual currency, points or some other compensation from the CCP for the user-generated revenue. There is also a need for a centralized and efficient ad management system that is capable of supporting multiple Web browsers and that may adjust quickly and efficiently to any changes in the ad formats utilized by various common search engines.

SUMMARY OF THE INVENTION

It is an object of the present invention to provide an Internet-based Commerical Content Provider Management System that allows each of multiple users that utilizes a computer or a mobile device for accessing and displaying Internet pages with commercial content, conducting Internet searches and to select and modify the commercial content provider. Another object of the present invention is to allow user to have more control over the commercial content (ads) layout and choice of the content as part of the Web pages in general and search results in particular that are populated and delivered to the user and any dynamic ad content that is delivered by the ad content provider servers into any Web page or search engine result page for the user.

Yet another object of the present invention is to comprehensive CCP control management system that allows Web and search engine users to have multiple options such as selecting no ads, select which CCP(s) should provide ads that appear with the Web pages having CCP and search engine results, control the appearance of the presented ads, and optionally allow users to receive certain consideration, virtual currency, points or some other compensation from the CCP for the user-generated revenue.

Another object of the present invention is to provide a centralized and efficient ad management system that supports multiple Web browsers and also quickly updates its knowledge base and adjusts to any changes in the ad formats utilized by various common search engines.

Still another object of the present invention is ability to control inherent characteristics of ads within specific CCP and within specific regions operated by a particular CCP.

Yet another object of the present invention is to provide a centralized server that may keep the ad content and/or allow access to the ad patterns and ad characteristics utilized by various Web pages with commercial content, search engines and ad servers. It may also allow operators to perform the centralized update of the ad content, ad patterns and ad characteristics, and further providing the updates specific to the search engines and ad content providers for each individual user who request updates from the server. It further allows user to have full control of the ad layout and other ad characteristic, in addition to the selection of CCP provider for the Web page and search engine results displayed on the user device.

These and other beneficial features and advantages of the present invention are disclosed in detail hereinafter with reference to the accompanying drawings and descriptive matter in each embodiment of the invention.

DETAILED DESCRIPTION OF THE INVENTION

Figure 5:
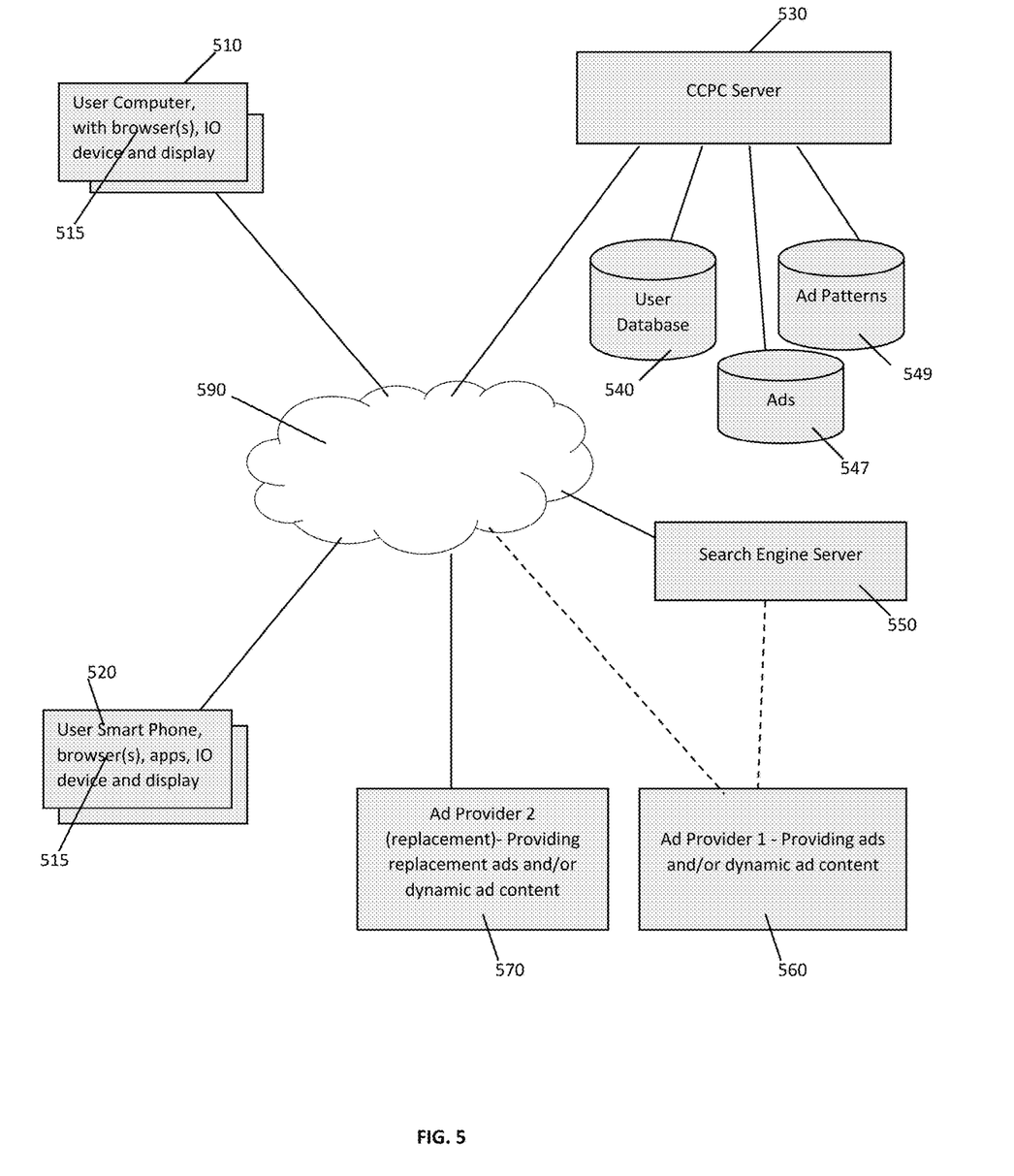
FIG. 5 illustrates a general environment and system organization for the user and CCPC in accordance with at least one embodiment of the present invention.

FIG. 5 illustrates a general environment and system organization for the user(s) and CCPC, search engine server(s) and ad server provider server(s) in accordance with at least one embodiment of the present invention. It is understood that there may be multiple computer devices, servers and databases utilized in connection with this description. One or more user(s) can utilize his or her computer 510, a mobile smart phone 520 or another mobile or stationary computer device with a display screen, an input device and equipped with an Internet browser 515 or an app on the smart phone, to allow the processor to execute computer instructions that allow the user to communicate through the Internet 590 and submit search request to a search engine server 550 and receive search result(s) from the search engine server. The user may also communicate through the Internet 590 with the CCPC server 530, which may store user-specific information and ad provider and display preference for the user in a file or database 540, and may also maintain a database of preferred ads 547 and a database of ad patterns 549 for the ads generated by different search engines. The CCPC server 530 may regularly update the database of preferred ads 547, to add any preferred ads that may fit user's preference, and update the database of ad patterns 549 in order to adjust for any changes in the formats or addition of different new ad formats or styles for any of the major search engines.

The search engine server may also communicate either directly or through the Internet 590 with the ad provider 1 server 560, which may provide actual ads or dynamic ad content to populate and display as part of the search results delivered by the search engine server 550 to each user, in response to his or her search request. The ads provided by the ad server 560 are included into search results sent back by the search engine server 550 to the user.

Irrespective of how the ad content is placed or inserted into the search results, the user may select to replace the ads and/or ad content provided by the ad server provider 1 560 with ad content from another ad provider 2 570. The replaced ad content would be seamlessly inserted into and replace the ads in the search results delivered to and/or displayed the user's computer 510 or smart phone 520 or another Internet-enabled device with a display, for displaying the search results and the ads to the user. The present system allows user to actively choose to replace ads of a particular CCP, such as for example ads from ad provider 1, 560 with ads from another CCP, such as for example ads from ad provider 2, 570. It also allows user to select and control the display format, options and characteristics of the delivered ads, in addition to the origin of the displayed ads.

The user computer 510 or the smart phone 520 is equipped with an Internet browser, or an app, which allows Internet browsing for a smart phone or any other mobile device. Any of multiple commercially available Internet browsers can be utilized.

Figure 1:
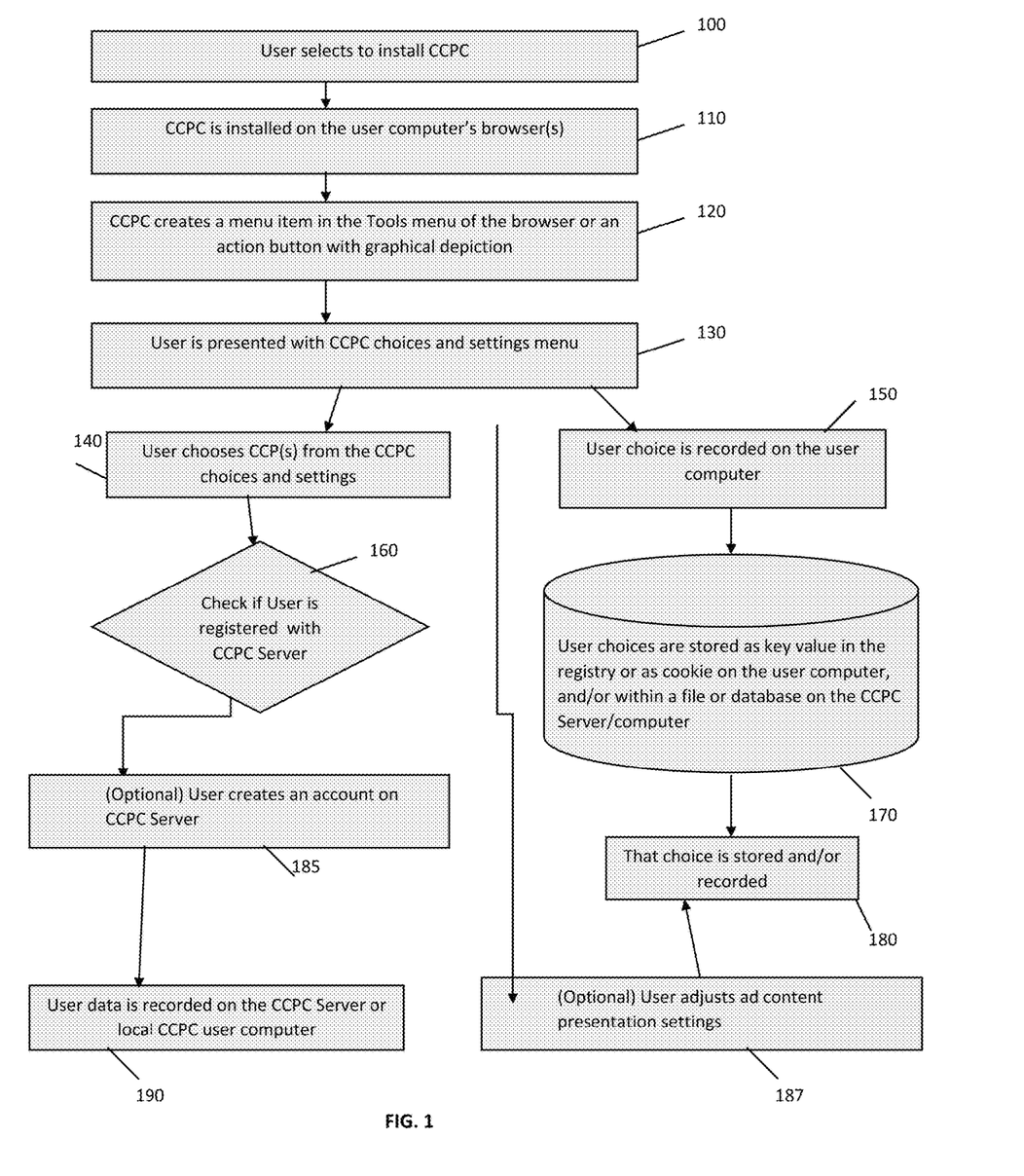
FIG. 1 illustrates a flow chart of the process of the user-driven installation of the Commercial Content Provider Controller (CCPC) system accordance with at least one embodiment of the present invention.

The process of installation and registration of the user with the CCPC is further described with reference to FIG. 1. First, the user is presented with the option to install the CCPC on the user's computer or mobile device, as shown at step 110. The browser may have an integrated module for setting user-specific characteristics for the user, named "Chose your CCP". Alternatively, if browser does not have such module it can be provided as an add-on/plugin/extension for the browser, which can be installed at step 120 on the computer or mobile device utilized by the user for searching the Internet, and it may also be part of or incorporated into the browser itself. CCPC installation process can be limited to any particular browser selected by the user or it may include installation process for all browsers installed on that computer, smart phone or another Internet search-enabled device.

If CCPC is installed as a plugin, it could also create a menu item in the menu of the browser, if the browser allows modifications to its menu, as shown at step 130. Alternatively, an action button with some graphical depiction can be created on the toolbar in the browser. When mouse or another scrolling or IO device passes over the action button, it will present user with the option to "Chose" or "Configure" his or her CCP, as indicated at step 140. When the button or menu item is selected or activated by the user, the User Interface (UI) for the CCPC will appear. Preferably, the user interface will contain a drop-box with instructions explaining how to select and choose CCP, change or modify the ad display and/or disable ads altogether. The drop-box may contain a number of items and settable options. In one embodiment, it will contain a list of selectable CCPs, with one of them being the default value. When a user clicks on or selects an item in the drop-down box, a particular CCP will be selected, or the default one will be changed. Alternatively CCPs can be presented to the user as checkboxes or through other user display options that allow selection of a CCP and change of a default value. Optionally, the user may select either none of the CCPs or multiple CCPs. The system may also check whether the user is registered on the CCPC server at step 160. If not, he may be asked to go through a registration process at 185, where he sets up a userid and optionally a password, and may also indicate other preferences concerning the CCP, such as the region or language(s) of the presented ads and/or other CCP and ad preferences and settings. The user selections and choices at step may be saved and recorded, as shown at steps 150 and 190, on the user computer as a key value in the registry, stored as a cookie or within a file or database on the user computer, as indicated at step 190 and on the CCPC server, as indicated at step 170. In addition to the selection of the CCP, the user may also be presented with the choices menu at step 130 to select and chose other ad presentation settings, including without limitation the format of the ad display, regional settings, preferred language and other ad-related presentation settings, as indicated at step 187. These additional choices and settings may also be stored on user computer, as a cookie, additions to the computer registry or some data files stored on the user computer. In addition, the user selections and settings may also be stored and recorded together with the choice of a CCP for that user on the CCPC server, as shown at step 180, indicating choices selections made by the specific user. If stored on the CCPC server, the user information may be identified and extracted from the file or database based on the userid and password that is generated or provided by the user as part of the registration step 185 with the CCPC server.

In addition to selecting CCPC User Interface will allow any other manipulations of the commercial content (ads) and choices concerning CCP and other user preferences. For example, the user may select to completely block ads, limit their amount, define their location on the page, appearance, or make other visual choices and selections concerning ad presentation settings, as indicated at step 187. These choices may also be recorded and saved locally on the user computer and/or on the CCPC server and user settings database. CCPC server may also contain or have access to a database of ad patterns, with the ad appearance for most or all major search engine result, as well as patterns of the major ad networks used on websites other than search engines.

Additionally, CCPC may also allow for a central update or upgrade mechanism, which will connect CCPC servers to various search engine and ad severs and allow to update the database of ad patterns in a given period of time (weekly, daily, hourly or more often). CCPC may provide and store the time stamp for the last update every time it updates its database(s).

Figure 2:
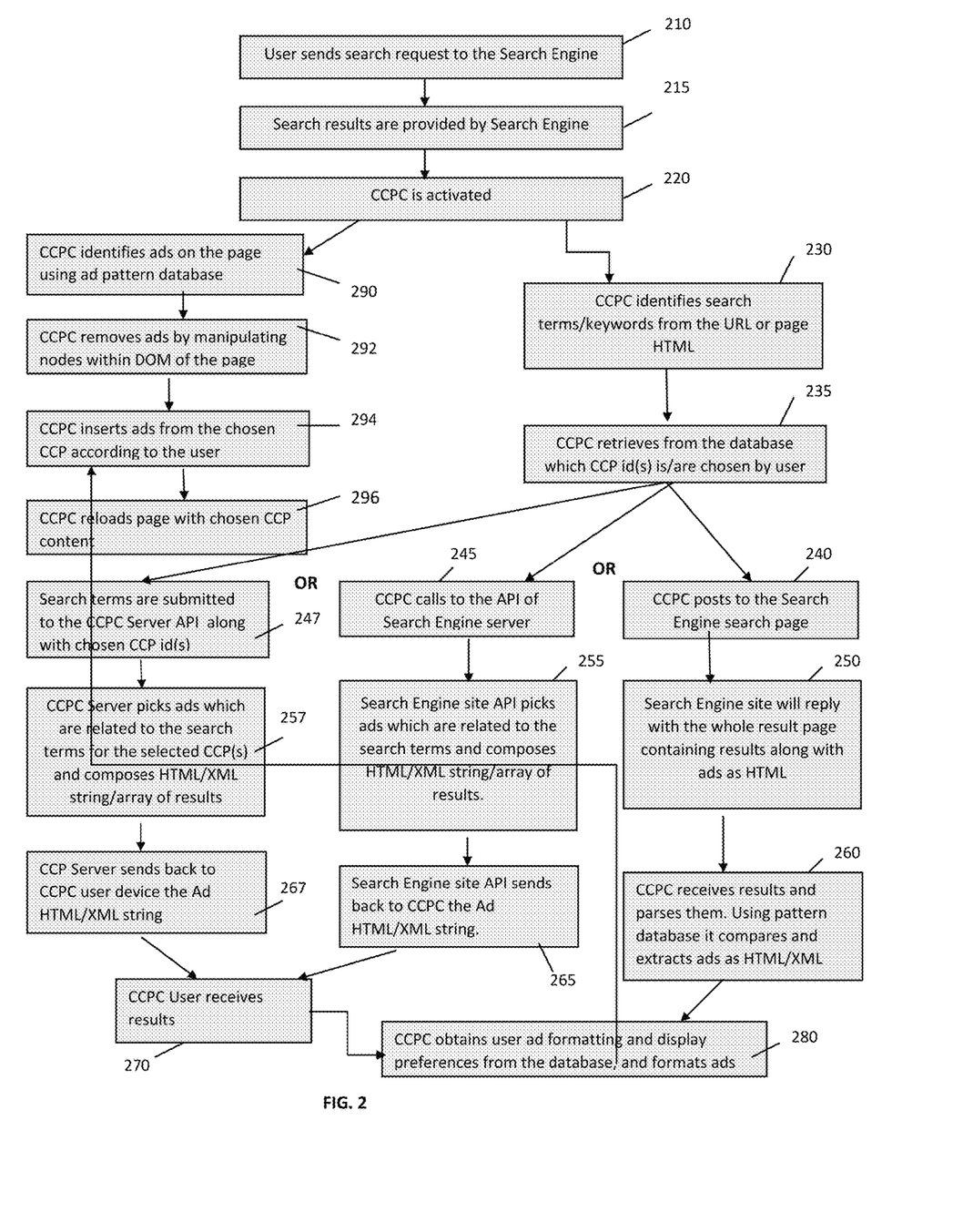
FIG. 2 illustrates a flow chart of the process of delivering search results and ad content to the user in accordance with at least one embodiment of the present invention.

CCPC will have the ability to work with browser requests and responses. Referring to FIG. 2, the user may send a search request to a search engine (one of many different search engines supported by CCPC) at 210. The results for those searches will be entered (written) either on the search engine pages forms or in search engine tool bars. Once a result page is provided by a search engine at 215, the plugin for CCPC in the browser used by the user become activated, as indicated at 220. Then, CCPC will identify keywords used in the search, by taking that value from the input box on the result page or from URL, as indicated at 230. The search terms along with other parameters such as browser type, search engine or page name, geo location, user info, browsing history etc. will be submitted to the CCPC server API, as for example via AJAX. The CCPC server either looks up user-specific settings in the user database that is maintained locally and/or on the CCPC server or, alternatively, receives user preferences from the cookie or registry information stored on the user device, determining, among other user settings and preferences, which CCP id is chosen by the use, as indicated in step 235.

CCPC server will send back to the user, the ad HTML/XML string which will contain ads generated by the chosen CCP(s). Those ads will be chosen based on the search terms along with other parameters such as browser type, search engine or page name, geo location, user info, browsing history etc.

The CCPC server can work in a configuration, where it will host multiple CCPs. Such server will have ads with respective keywords of many providers stored in a database. When request will be send, it will have id's of the requested providers along with keywords. The server will send back ads from each chosen provider for given set of keywords in a given format, as for example as HTML/XML. As soon as response from the CCPC server is received, plugin will parse it, and format it in a user desired format.

Once the CCPC determines the CCP id for a particular user at step 235, it may utilize multiple processes to retrieve and present the ad content from a specific CCP (or multiple CCPs) chosen by the user. The search terms may be submitted to the CCPC server through an API, along with the chosen CCP id(s), as indicated at 247. The server may maintain its own database of ad content and select the ads that are related to the search terms for the selected CCP(s) for a particular user and compose an HTML/XML string/array of ad results, and send the ad HTML/XML string back to the user, as indicated at 267. The user CCPC receives the ad-related string at 270, extract the formats and other ad content display preferences for the user from the database and formats the ad results in accordance with user preferences at 280. The database with formatting information may be kept locally on the user computer or the CCPC may call the CCPC server with the userid for a particular user and obtain the formatting and other display data from the central database on the CCPC server. Once the ad display preferences and ad formats for the user are extracted and processed, the CCPC on the user computer inserts the formatted ads from the CCP of the user's choice and in accordance with the user formatting options into the search result Web page, as indicated at step 294. The resulting Web page(s) are then reloaded in the user browser and displayed on the user display, at 296.

Alternatively, if the CCPC server is not capable to communicate and deliver ads to the user directly, then API calls, as shown in step 245, as for example via AJAX can be made to a specific search engine server, if the search engine server supports an API call access. The search engine server API receives the CCP id or other indicators for the CCP(s) chosen by the user and selects ad content corresponding to the chose CCP(s) and the search terms provided by the user, as shown at step 255. Once the proper ad content is selected by the search engine, it may send through an API the ad HTML/XML string for the ad content back to CCPC, as indicated at 265. The ad content provided by the search engine API is then received by the CCPC at 270, at which point the CCPC may optionally apply user ad display preferences and formatting at 280, insert or modify the formatted ad content in the resulting Web page together with the search results, at 294 and reload the resulting Web page to affect the resulting display to the user, at 296.

If a particular search engine does not have a specific API for processing and delivering ads for an indicated CCP selected by the user, then CCPC can determine which Search Engine will provide the ad content that corresponds to the user-selected CCP and make a post to the search engine server page using XMLHttpRequest object or similar call, as indicated in step 240. The post/request will have keywords within its parameters. The site will reply with the whole result Web page containing search results along with ads that are chosen by the search engine rather than the user, as indicated at step 250. In that case, at step 260, the CCPC plugin will identify ads presented by the search engine using an ad pattern database and remove the search results, keeping only the ads content for CCP provided by the search engine, which corresponds to the user-selected CCP. The ad patterns may be stored centrally on the CCPC server, with updated copies for the particular user on the user computer, possibly as files or a small database in the computer or external memory. Alternatively, user CCP may make calls to the CCPC server and receive updated ad patterns. Then, the CCP and the Plugin on the user computer will take those ads and format them in a user-desired format and also apply user-selected ad display options, at step 280. Then the ad content corresponding to the CCP of user choice is inserted and combined with the search results, which may be those from a different Search Engine that called at 240. Once the search results are combined with the formatted ad content, the resulting Web page is displayed to the user at 296.

As shown at step 290, the second function of the plugin which is processed concurrently, is to remove the original ad content provided by the search engine result and replace the ads with the CCP ads of the user preference, provided by the CCP that is preferred and selected by the user. In order to identify original ads the pattern database will be used. Patterns will be compared to the page content for that specific search engine web page. Then by doing DOM (Document Object Model) nodes insertions and deletions, the original ads are removed and replaced with the CCP server ads, as indicated at steps 292 and 294, the latter chosen in accordance with the user settings and preferences. CCP server ads are then added to the Search Result Web Page in any desirable fashion at any position typically reserved for the ad content. It can be a single ad block or multiple blocks. The ad content may be with or without images, as a part of a geo map, etc. There are no limitations on the presentation of the ads on the resulting page. Once the ad content provided by the CCP of the user choice is inserted into the Search Result Web page HTML, the newly formed page is loaded on the user computer from the local memory. As discussed above, the formatted ad content may come directly from the ads maintained and processed by the CCPC server, as indicated in the process following the steps from 247, or it can be the ad content for a specific CCP provided by the search engine API, as indicated in the process following the step from 245. Also, it could be the ad content that is extracted from the full search result Web page by the CCPC, after it posts to the appropriate Search Engine search page and extracts the full search result page and ad content, and then removing the search results, while keeping an formatting the ad content, as indicated in the process following the steps from 240. As a result, the display on the user device will present to the user, at step 296, and the user will see ads from his choice CCP, displayed in the format that is preferred and selected by the user, and also including other ad display preferences chosen by the user.

Such technique will be used on every major search engine, and can be used on any other websites, for as long as it does not violate copyrights of such sites. For example, many websites have section of their pages dedicated to the advertisement. They display ads from their choice CCP. Unlike ads from the search engine's pages, this ads show content based on user characteristics and his prior searches or browsing history. The pattern of such ads is determinable and can be matched. In this case CCPC could parse every page HTML before displaying. Then as it was explained above CCPC will analyze page HTML, detect ads if they are matching known patterns. Then it may remove that portion of the HTML and manipulate DOM to substitute it with ads from chosen CCP.

Figure 6:
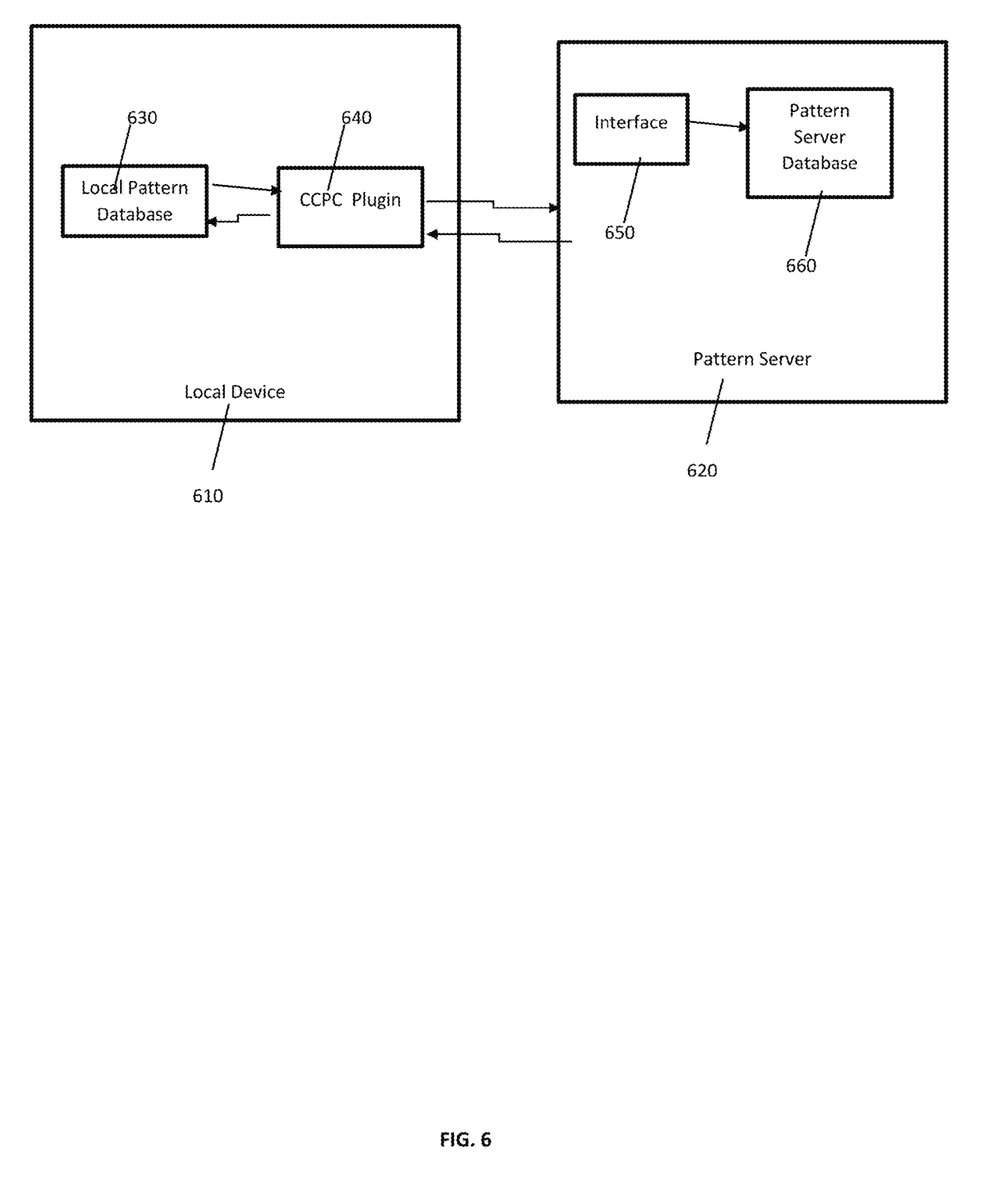
FIG. 6 illustrates one possible arrangement and organization of the ad patterns stored by the CCPC and local computer and quick updating capabilities in accordance with at least one embodiment of the present invention.

The update functions of the CCPC are described with reference to FIG. 6 and FIG. 3. In order to successfully remove an unwanted commercial content from Web pages, the CCPC server and/or the CCPC on the user computer should have an up-to-date database of ad patterns. Updates to these ad patterns can be done by connecting and/or establishing communications between the user computer 610 and the Pattern Server (PS), which may reside on the CCPC server 620 and store multiple add patterns for various search engines and ad service providers in a PS database 660. Alternatively, the CCPC server may access the PS database on a different server by generating for example SQL command to obtain proper ad patterns for a particular search engine and then store those pattern in computer memory on the CCPC server (which may be temporary or permanent memory), and further to communicate and send some the updates of the ad patterns to the user device 610. The communications between the user device 610 and the PS database 660 may preferable be done through a CCPC Plugin 640 on the user device and the interface 650 on the CCPC server. The user computer or other device may also store the updated ad pattern in the local memory, file, database or any other memory residing in on or accessible by the user device 610. This local copy of the ad patterns stored on the user device reflects only the updates to ad patterns that are relevant to the search engines and ad servers utilized by that user. The PS database 660 may contain a much broader set of ad patterns, applicable to other users, search engines, CCPs and geographic regions.

The PS database will store known patterns of ads for all largest and most commonly used search engines and other CCPs. It will have patterns for all possible ad appearances, particularly for different regions and languages, where different regions and users in different countries are presented with different appearance of ads and search results on the Web pages from the same Search Engine. The PS User Interface will be used to save and edit records of ad patterns in that database. Patterns will be identified manually or with some programmatic tools by analyzing HTML of the pages and extracting the ad portion of the html, and finally defining a rule for specific pattern, wherein that pattern is reappearing on various permutations of dynamic search result pages. A complete pattern record will have pattern beginning string and pattern end string. Alternatively, it might be node names for DOM, or functions in JavaScript. Every time when a record is saved in the database, the database "Last Updated" value will be reset to the current time. It may be called Last Update Time (LUT) PS and may be connected to the Internet using some protocol, like for example HTTP. CCPCs installed on individual user computers or user device may periodically connect and receive updates of the ad patterns from the PS. The PS 620 will have one or multiple centralized databases, which contain up-do-date ad patterns for various search engines. The updates to the ad patterns on the CCPC may be done in any specific time intervals, weekly, daily or possibly more often. The CCPC on the user computer may update its locally stored ad patterns though the communications and transmissions through the CCPC Plugin 640 and PS interface 650 on the PS. The local pattern database 630 on the user CCPC will be updated directly from the PS when the update of patterns is required. The PS will update its stored patterns in its PS database, and will only need to provide updates to the CCPC on the user computer if the timestamp or update indicates that the user does not have the latest ad formats for the particular region or country. The CCPC will request LUT from PS, and if that LUT will be later than previously saved time of update stamp, then CCPC will need to run an update for its local ad pattern 630.

Figure 3:
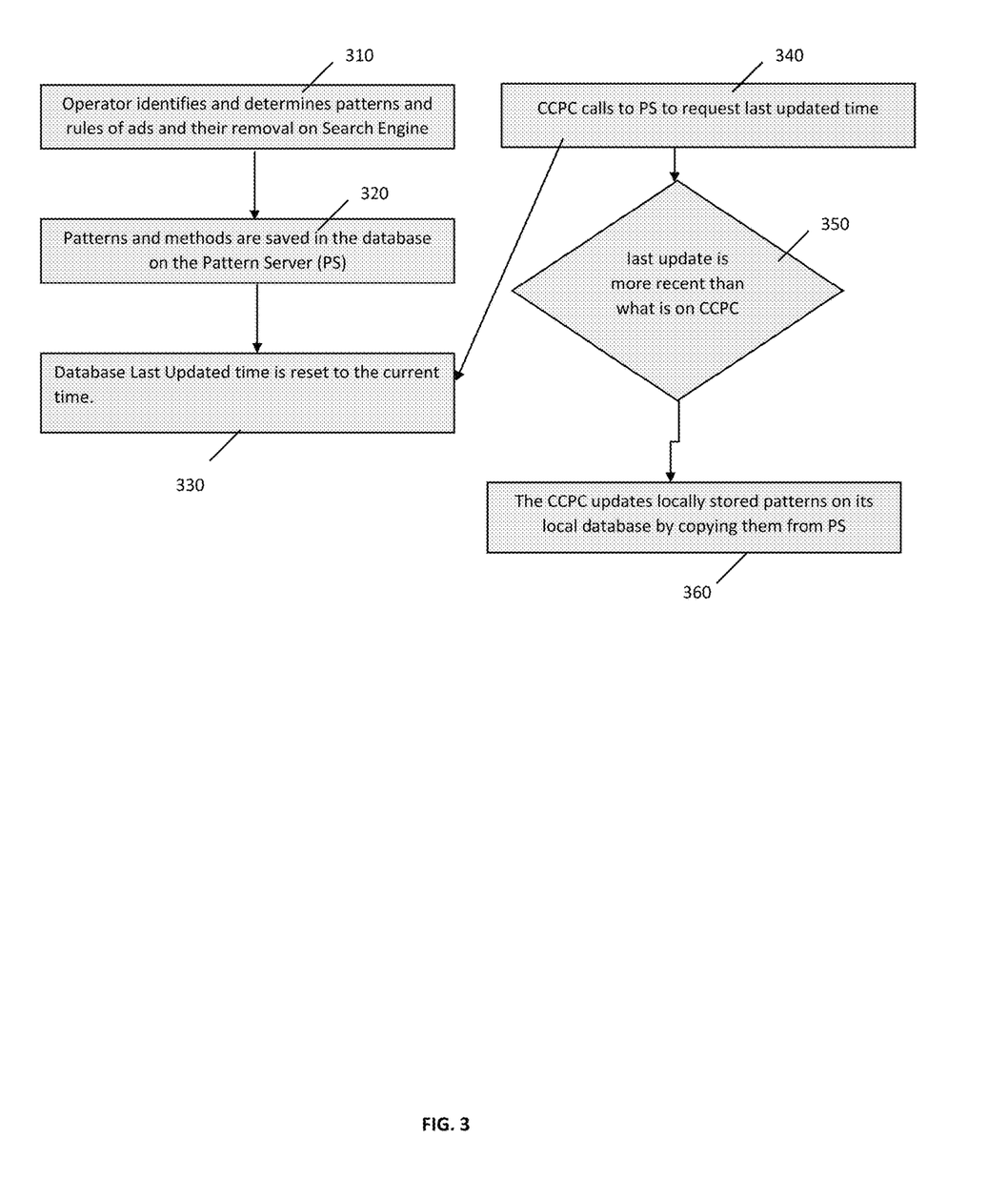
FIG. 3 illustrates a flow chart of the updating process for the CCPC system in accordance with at least one embodiment of the present invention.

Referring to FIG. 3, the operator on the CCPC server and/or PS may identify and determine updates or some new ad patterns and ad display formats and rules, as well as ad removal procedures for a search engine ads, as indicated at step 310. It should be noted that PS may be incorporated as part of CCPC server or may be a separate server accessible by CCPC server. The identified updates and new ad patterns, rules, ad removal procedures and other content related information for one or more search engines and ad content servers is then placed in the PS database. Once stored in the PS database, it may include a time stamp. When the user CCPC calls or communicates to the PS database to request the last updated time stamp at 340, the PS may compare the "last update" time stamp and/or the update version on the user CCPC, in the local database, with the time stamp and/or the update version on PS, as shown at 350. If the last update of relevant ad content on the user CCPC is older than that of the PS, the CCPC may update the local database of the stored ad patterns on the user CCPC by receiving, copying and storing the relevant ad patters from the PS database. Any number of data exchange protocols may be used to transfer the updated ad patterns from the PS database to the local pattern database on the user device.

Figure 4:
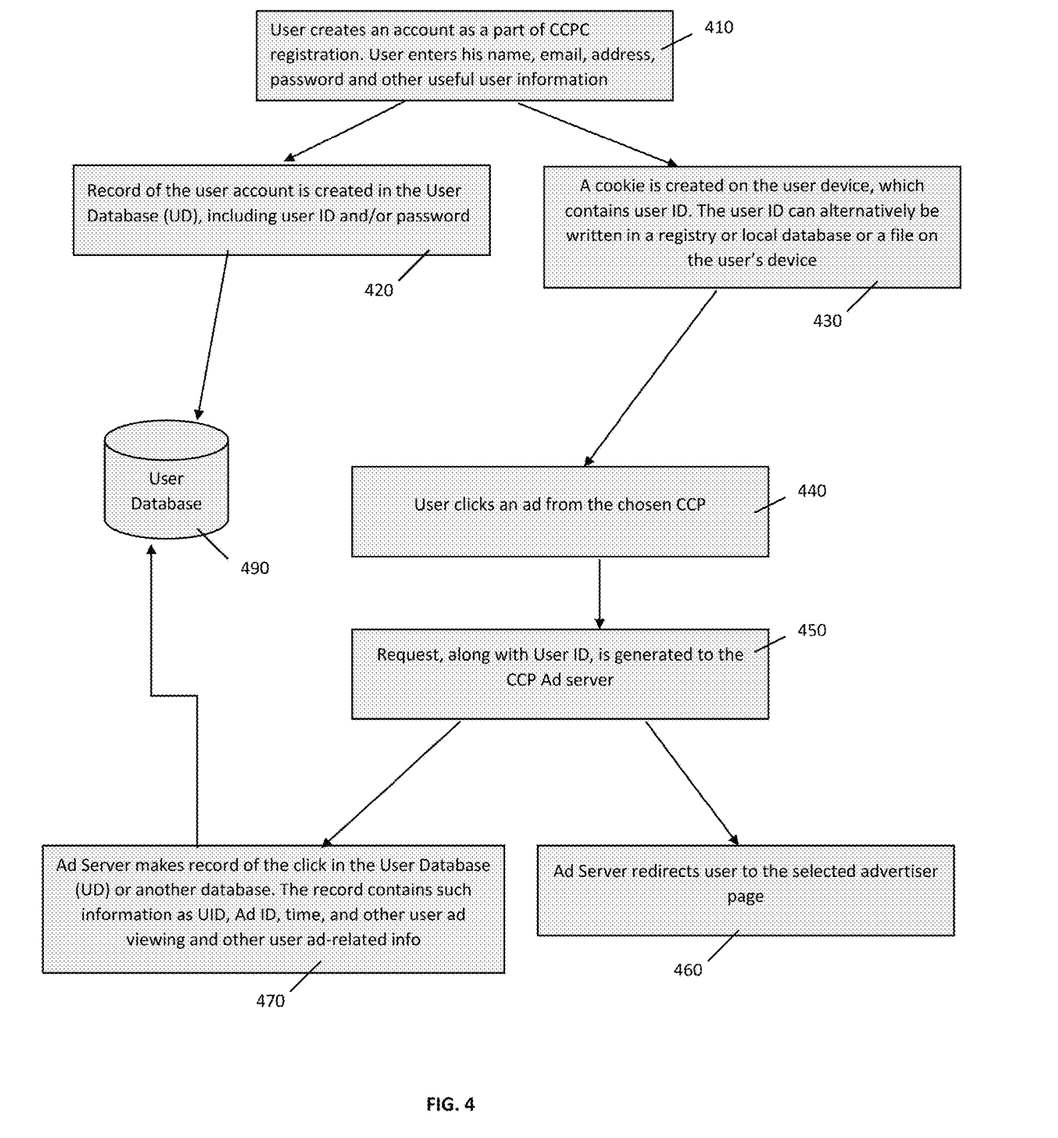
FIG. 4 illustrates a flow chart of the process of establishing and creating a user account with the CCPC system and maintaining record of user activity and ad delivery.
Figure 7:
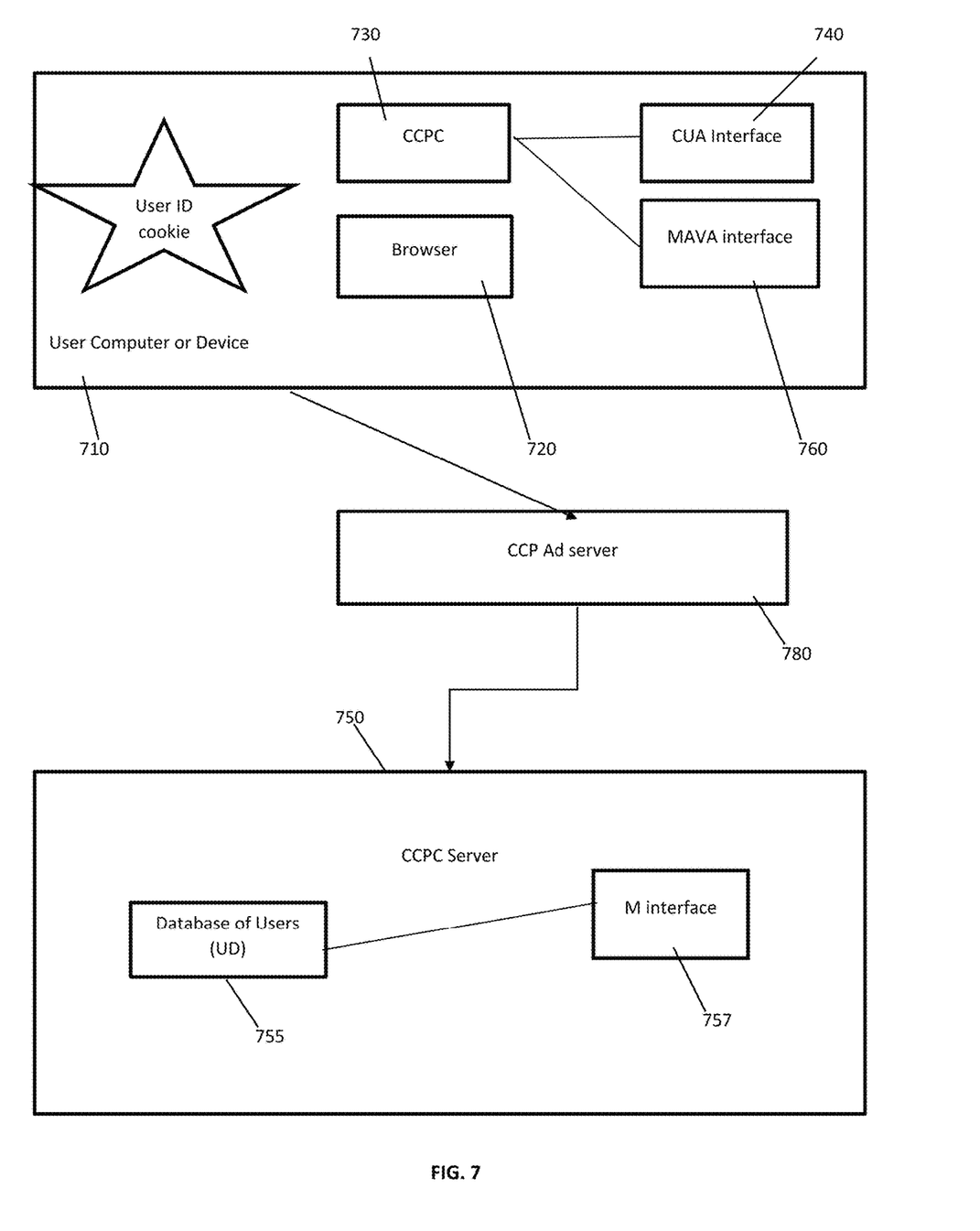
FIG. 7 illustrates one possible arrangement of the communication protocol and exchange of information between the user's computer, CCP ad server and CCPC server and tracking of user activity with at least one embodiment of the present invention.

The processing and registration of the user-related information by the CCPC server is described with reference to FIG. 7 and FIG. 4. The CCPC might want to keep track of user's activity related to the commercial content and other ad-related activities of the user. It might be needed to see which specific ads were clicked or not clicked by which user, when the user prefers to receive the commercial content, whether the user responded and selected any of the delivered commercial content and also to keep track of other user choices and activities. This is particularly important when CCP offers some kind of incentive, like loyalty points, virtual cash or some other payment or incentive offered to the user for using, viewing or taking any particular action in response to the delivered commercial content. In order to track user's activity within a CCP content, the system may utilize an additional user management module or server.

In one possible configuration, the CCPC server 750 contains and stores user-specific information in a User Database (UD) 755 on the server computer system, or accessible by the CCPC server. Among other user-specific data, the UD may store user data such as (a) user personal information, and (b) user ID and/or password. Another type of data stored in the UD will include information on (a) ads clicked by a user and/or (b) choices and actions of the user in response to being presented the ad content. It may also contain such data as ad id, user id, time of the click, whether user initiated any further actions, purchases or other activities in response to the presented ad content. Ad id may be provided by the internal CCPC ad server, or a third party ad server (or the search engine providing the ad content).

CCPC on the user device may have two or more additional interfaces. First, the interface to create user account (CUA Interface), 740. Second, interface to manage and view account activity (MAVA interface), 760. It will also have a browser 720 and CCPC Plugin 730 for communicating over the Internet with CCPC server 750 and ad server 780. Lastly, CCPC server 750 might also have the management interface which will allow to create, delete and edit user accounts, as well view and edit user activity, (M interface) 757. The user information about other users on the CCPC server will not be open to an individual user (for privacy reasons) and will typically be utilized by the server CCPC for the purposes discussed above. The M Interface might allow an individual user to access his own data and review his own activities, ad content, incentives, etc. Each of these interfaces can be implemented within a browser and be connected via some protocol like http or https.

When user chooses to use a CCPC and it will need to identify such user, the CCPC on the user device may open or provide communication to the CUA Interface 740. The CUA Interface will allow user to enter his name, email, address, password and other useful user-related information and preferences, as indicated in step 410 in FIG. 4. After successful creation of user account, a record will be created in UD and may include userid and other user data, as indicated at step 420. At the same time, the CCPC on the user computer may store in or create a cookie, which contains the user ID, as indicated at step 430. The user ID can alternatively be written in a registry or local database or a file on user's computer.

While browsing the Internet, the user may click on the ads from the chosen CCP, as indicated at 440s, each ad link responsive to the user's click may contain at least the following information: UserID, Ad ID. Respectively, when clicked that link will be generating request to the CCP Ad server, as indicated at step 450. Besides redirecting user to the advertiser's web page at step 460, that server will be making a record of the click, related ad information and further user actions (at step 470) and may store this information in the UD, as indicted at step 470. The record may contain information related to UID, Ad ID, time, and optionally other info like IP, location etc. Notice that CCP Ad server can be the same or different computer as CCP User Server. Respectively the database of user-related information can instead be a part of some bigger Ads database.

Once account for User Management is created, MAVA interface 760 becomes available for the user. When invoked it will prompt user to enter user name and password. Once the user is logged in, he will be able to view, edit, track and operate on this account information. Among other things, he may be able to view his browsing ads activity for that CCP and any incentives associated with those activities.

Whenever user accounts or browsing activity will need to be managed by CCP, the M interface 757 will be invoked. Operator will be able to add, delete or edit information related to the user account or to browsing activity of a user. Optionally, M interface may also perform other functions related to operation of user's actions and reactions to the ad content provided by the CCPC. It can also monitor the incentives provided to users and can help direct the best incentive packages and offers to the specific users. Other uses and options are contemplated by this invention.

The above embodiments are provided for illustrative purposes and are not intended to limit the user's ability to control commercial content to any specific embodiment. For example, if a particular browser on the CCPC user device allows it, the CCPC may skip the step of initial loading of a page. Instead, the CCPC server may intercept the submitted url before submission by the user, and may also extract keywords from that url or Request variables. Then, it may submit a request to the Ad server based on keywords. At the same time, the CCPC may also submit request to the search engine. Both resulting responses my then be formatted and merged together according to the user preferences. Subsequently, the resulting page is formatted and displayed to the user.

As another alternative, it may be possible to process, format and manipulate pages on the Server or on the individual user computer/smart phone. Depending on processing power and bandwidth available for the user device, some of the steps described above in connection with the CCPC server may be done on the individual user's computer or mobile device. For example as an alternative, the heavy server and light client configuration may perform all database storage and data access processing on the server and only send incremental updates and changes to the individual user device. Such design and alternative might be useful for the individual user computers/smart phones with low memory capacity and low processor speed. In such alternative, the CCPC server contains or has access to a database for all sites on which Ads are to be replaced are stored. The database contains at least a table where the following info is stored: site url, domain name, ad type (if needed), method of substitution, the HTML patterns and DOM Selectors which are used to replace ads. When a site transmits a Web page/is loaded e.g. example.com, the CCPC will query server for the site existence in the server database. CCPC also will submit id of the user choice CCP and search keywords. If a particular Web site is in the database, the server will process it. First it will take ID of the chosen CCP along with keywords and will return Array/XML of ads from the ads server corresponding to the terms of search and from the chosen CCP. At the same time it will retrieve from the database method of substitution along with patterns or DOM elements. Both ads array/xml and patterns or DOM elements are then returned to the CCPC local user device. The CCPC will parse original HTML, remove original ads and merge Content together with new ads. Then, the resulting page HTML is reloaded and displayed on the user device.

CCPC can also be installed as an app on a mobile device which will externally control the user's smartphone or some other mobile device browser functionality and operation. This optional configuration may be useful for the mobile devices where the installed browser does not allow plugins.

Other possibilities, including finer selection within a chosen CCP, are also contemplated. For example some CCPs might allow certain content limited subsets of ads. So, a user can always select such limitations. An example of such subset would be ads approved for children or ads for "Made in USA" goods only, etc. In such case, the requests from the user will have Subset ID along with CCP id. And the ad server will pick only ads of chosen kind in response.

The above embodiments and illustrative descriptions of the application of the principles of the present invention are intended to enable a person skilled in the art to make or use the disclosed invention. They are not intended to be either exclusive, exhaustive or limiting on the scope of the invention described and claimed herein. Other variations or modification could be used and applied by a person skilled in the art without deviating from the scope and spirit of the present invention. Such modifications and alternatives arrangements are not intended invention to be outside the scope of the present invention and are intended to be covered by it. The invention title and abstract are not intended to limit the claimed invention or cover multiple embodiment and all various features of the claimed invention.

What is claimed is:

1. An automated system comprising:
a user electronic device having a display, a non-transitory computer readable memory, storing computer instructions, and a processor; said processor configured to execute a plurality of computer instructions stored in the memory, and causing the automated system to:
select and store information identifying a first commercial content, who provides commercial content from multiple advertisers of said content, wherein the and identification of the first commercial content provider is selected by a user and entered through an interface of the user electronic device;
submit an initial Web page request and obtain an initial Web page results responsive to the initial Web Page request;
perform automated recognition processing on a digital content of the initial Web page results by comparing it against a database of advertisement patterns, wherein the recognition processing uses document object model nodes, HTML code, or XML code insertions and deletions to replace commercial content on the initial Web page results;
identify, at least one position on the initial Web page results, a commercial content from at least one second commercial content provider;
generating a request to a server of the first commercial content provider;
in response to a request to the server of the first commercial content provider, receive a separate response from the first commercial content provider, the response comprising at least one commercial content from the first commercial content provider, wherein the server of the first commercial content provider is different from a server of the second commercial content provider;
automatically substitute in the initial Web page results the commercial content received from the second commercial content provider with commercial content from the first commercial content provider in the position identified by the automated recognition processing of the initial Web page results; and
display the initial Web page results with the substituted commercial content on a display screen of the user device.

2. The system of claim 1, wherein the processor issues additional instructions to:
allow the user to select and identify a format preference for the display of the commercial content from the first commercial content provider;

store said display format preferences in the memory of the user device;
extract the stored display format preferences; and
reformat the substituted commercial content that is displayed as part of the initial Web page results on the display screen of the user device in accordance with the extracted display format preferences.

3. The system of claim 1, wherein the initial Web page request is a search request to a search engine, and the initial Web page results are search engine results responsive to the initial search request, and wherein the processor issues instructions to generate a search request directed to the first content provider, and for automatically recognizing and extracting the commercial content from the Web page results provided by the first commercial provider in response to the search request to the first commercial provider.

4. The system of claim 1, wherein the processor issues additional instructions to:
receive and store advertisement patterns used by at least one Web site for the commercial content included with the initial Web page results; and
replace the commercial content included with the initial Web page results based on reference to said advertisement patterns.

5. The system of claim 1, wherein the processor issues additional instructions to:
update the stored advertisement patterns with the changes to advertisement patterns and formats of advertisement patterns used by at least one Web site that provides commercial content on at least one of its Web pages.

6. The system of claim 1, wherein the processor issues additional instructions to:
allow the user to select at least one option determining a display format of the initial Web page results and store said user selection; and
display the initial Web page results with the substituted commercial content on the user device, based at least partially on the display format option selected by the user.

7. The system of claim 1, wherein the user device comprises a personal computer.

8. The system of claim 1, wherein the user device comprises a mobile device.

9. The system of claim 8, wherein the mobile device comprises a smart phone.

10. A method for displaying a commercial content on a user electronic device, said method comprising the steps of:
selecting and storing in a non-transitory computer-readable memory of a user electronic device an information identifying a first commercial content provider, who provides commercial content from multiple advertisers of said content, wherein the identification of the first commercial content provider is preferred by the user, and entered through an input interface of the user electronic device;
submitting an initial Web page request to obtain an initial Web page results responsive to the initial Web Page request;
performing automated recognition processing on a digital content of the initial Web page results by comparing it against a database of advertisement patterns, wherein the recognition processing uses document object model nodes, HTML code, or XML code insertions and deletions to replace commercial content on the initial Web page results;
identifying, at least one position on the initial Web page results, a commercial content from at least one second commercial content provider;
generating a request to a server of the first commercial content provider;
in response to a request to the server of the first commercial content provider, receiving a separate response from the first commercial content provider, the response comprising at least one commercial content from the first commercial content provider, wherein a server of the first commercial content provider is different from a server of the second commercial content provider;
automatically substituting in the initial Web page the commercial content received from the second commercial content provider with commercial content from the first commercial content provider in the position identified by the automated recognition processing of the initial Web page results;
displaying the initial Web page results with the substituted commercial content on a display screen of the user device.

11. The method of claim 10, further comprising the steps of:
allowing the user to select and identify a format preference for the display of the commercial content for the first commercial content provider;
storing said display format preferences in the memory of the user device;
extracting the stored display format preferences; and
reformatting the substituted commercial content that is displayed as part of the initial Web page results on the display screen of the user device in accordance with the extracted display format preferences.

12. The method of claim 10, wherein the step of submitting the initial Web page request includes submitting a search request to a search engine and the step of displaying the initial Web page results includes displaying the initial search engine results responsive to the initial search request, the step of generating a request to the first commercial content provider includes generating a search request directed to a first content provider, and the step of receiving a response from the first commercial content provider further includes automatically recognizing and extracting the commercial content from the Web page results provided by the first commercial provider in response.

13. The method of claim 10, further comprising the steps of:
receiving and storing advertisement patterns used by at least on Web site for the commercial content included with the initial Web page results provided by that Web site in a database of advertisement patterns from different content providers; and
replacing the commercial content included with the initial Web page results based at least partially on a reference to said advertisement patterns stored in the database.

14. The method of claim 10, further comprising the steps of:
updating the stored advertisement patterns from different content providers with the changes to advertisement patterns and formats of advertisement patterns used by at least one Web site that provides commercial content on at least one of its Web pages.

15. The method of claim 10, further comprising the steps of:

allowing the user to select at least one option determining the display format of the initial Web page results and store said user selection; and displaying the initial Web page results with the substituted commercial content on the user device, based at least partially on the display format option selected by the user.

16. A method for providing user-selected commercial content with an initial Web page results responsive to an initial Web page request, said method comprising the steps of:

receiving and processing a user registration and preferences information in at least one database accessible and operable by a computer processor, wherein said user information comprises:

a user identification data;

a user choice data, identifying a user choice and selection of a first commercial content provider, who provides commercial content from multiple advertisers of said content, wherein the identification of said first commercial content provider is selected by the user; and a user format choice and selection data of a format and display options for a commercial content from said selection of the first commercial content provider;

creating and maintaining a database of patterns of commercial content for different commercial content providers;

performing automated recognition processing on a digital content of the initial Web page results, recognizing and identifying a position of at least one commercial content from a second commercial content provider that is transmitted with other data as part of the initial Web page results using at least partially the patterns of commercial content store in the database, wherein the recognition processing uses document object model nodes, HTML code, or XML code to replace commercial content on the initial Web page results;

generating a request to the first commercial content provider;

receiving a response from the first commercial content provider, the response comprising at least one commercial content from the first commercial content provider;

formatting the obtained commercial content from the first commercial content provider in accordance with the user formatting and display preferences;

automatically substituting at each determined position in the initial Web page results the formatted commercial content received from the first commercial provider in place of the identified commercial content of the second commercial content provider in the initial Web page results;

including the formatted and substituted commercial content in the initial Web page results with other data; and submitting the initial Web page results with the formatted and substituted commercial content for display on the user device.

17. The method of claim 16, wherein the step of submitting the initial Web page request includes submitting a search request to a search engine, the step of generating a request to the first commercial content provider includes generating a search request directed to a first content provider, and the step of receiving a response from the first commercial content provider further includes automatically recognizing and extracting the commercial content from the Web page results provided by the first commercial provider in response using at least partially the patterns of commercial content stored in the database.

18. The method of claim 16, further comprising the steps of:

receiving and storing advertisement patterns used by at least one Web site for commercial content included with the initial Web page results provided by that Web site; and updating the stored advertisement patterns with the changes to advertisement patterns and formats of ad patterns used by the Web site that provides commercial content on at least one of its Web pages in response to the initial Web page request.

19. The method of claim 16, further comprising the steps of:

transmitting the Web page results with the formatted commercial content for display on a display screen of a mobile user device having a processor, a computer memory, input interface and a display screen.

20. The method of claim 16, further including the steps of:

storing a plurality of options and limitations related to the first commercial content provider that is preferred and selected by the user;

retrieving and applying said options and limitations for the first commercial content provider to the initial Web page results with substituted commercial content.

* * * * *